United States Patent
Schuler

(10) Patent No.: US 9,347,256 B2
(45) Date of Patent: May 24, 2016

(54) METHOD FOR PRODUCING AN INSULATING GLASS PANE

(75) Inventor: Peter Schuler, Tiefenbronn (DE)

(73) Assignee: Bystronic Lenhardt GmbH, Neuhausen-Hamberg (DE)

(*) Notice: Subject to any disclaimer, the term of this patent is extended or adjusted under 35 U.S.C. 154(b) by 926 days.

(21) Appl. No.: 13/386,274

(22) PCT Filed: Jul. 15, 2010

(86) PCT No.: PCT/EP2010/004302
§ 371 (c)(1),
(2), (4) Date: Mar. 15, 2012

(87) PCT Pub. No.: WO2011/009554
PCT Pub. Date: Jan. 27, 2011

(65) Prior Publication Data
US 2012/0180936 A1    Jul. 19, 2012

(30) Foreign Application Priority Data
Jul. 24, 2009 (DE) .......................... 10 2009 035 002

(51) Int. Cl.
*E06B 3/673* (2006.01)
*B29C 47/00* (2006.01)
(Continued)

(52) U.S. Cl.
CPC ........... *E06B 3/6733* (2013.01); *B29C 47/0019* (2013.01); *B29C 47/026* (2013.01);
(Continued)

(58) Field of Classification Search
CPC .................... B05C 5/0216; B05C 9/06; E06B 2003/67378; E06B 3/66328; E06B 3/6733; E06B 3/6775; Y10T 156/1798
See application file for complete search history.

(56) References Cited

U.S. PATENT DOCUMENTS 4,708,762 A * 11/1987 Lenhardt ..................... 156/556
5,173,148 A    12/1992 Lisec
(Continued)

FOREIGN PATENT DOCUMENTS

GB    1 441 798        7/1976
WO    WO 90/02696 A1  3/1990
WO    WO 91/06740 A1  3/1991

OTHER PUBLICATIONS

Machine Translation of WO9106740.*

*Primary Examiner* — Christopher Schatz
(74) *Attorney, Agent, or Firm* — Hackler Daghighian & Martino

(57) ABSTRACT

The invention relates to a method for producing an insulating glass pane comprising a plastic spacer, wherein two glass panels (25, 49) arranged parallel to each other have a target distance from each other, by ☐forming a composite strand (26) by the temporal and spatial overlapping extrusion of at least two plastic partial strands (23, 24), wherein a first partial strand (23) is made of an adhesive first sealing compound (3), in which a moisture-binding substance is embedded, and a second partial strand (24) made of an adhesive and binding second sealing compound (4), a first glass panel (25) along the edge of the glass panel (25), specifically such that the beginning and end of the composite strand (26) abut and form a frame in that the first partial strand (23) is extruded with a predetermined first target thickness, which is greater than the target distance, and the second partial strand (24) is extruded with a predetermined second target thickness, which is greater than the target distance, on the glass panel (25), the partial strands (23, 24) are located next to each other in the composite strand (26) and thus immediately adjoin each other, and the first partial strand (23) is located within the frame formed by the second partial strand (24), ☐joining the first glass panel (25) to the second glass panel (49) such that the composite strand (26) is located between both glass panels (25, 49), connects them to each other, and keeps them at a distance from each other and ☐setting the target distance by pressing the joined glass panels (25, 49).

18 Claims, 14 Drawing Sheets

(51) Int. Cl.
  *B29C 47/02* (2006.01)
  *E06B 3/663* (2006.01)
  *B29C 47/54* (2006.01)
  *B05C 5/02* (2006.01)
  *B05C 9/06* (2006.01)
  *B29C 47/06* (2006.01)
  *B29C 47/14* (2006.01)
  *B29C 47/36* (2006.01)
  *E06B 3/677* (2006.01)

(52) U.S. Cl.
  CPC .............. *B29C47/364* (2013.01); *B29C 47/54* (2013.01); *E06B 3/66328* (2013.01); *B05C 5/0216* (2013.01); *B05C 9/06* (2013.01); *B29C 47/065* (2013.01); *B29C 47/145* (2013.01); *B29C 47/367* (2013.01); *E06B 3/6775* (2013.01); *E06B 2003/67378* (2013.01); *Y10T 156/1798* (2015.01)

(56) References Cited

U.S. PATENT DOCUMENTS

| | | | |
|---|---|---|---|
| 5,350,469 A * | 9/1994 | Lenhardt et al. | 156/102 |
| 5,961,759 A | 10/1999 | Schubert | |
| 6,235,356 B1 * | 5/2001 | Shibuya et al. | 428/34 |
| 2005/0167028 A1 * | 8/2005 | Reichert | 156/109 |

* cited by examiner

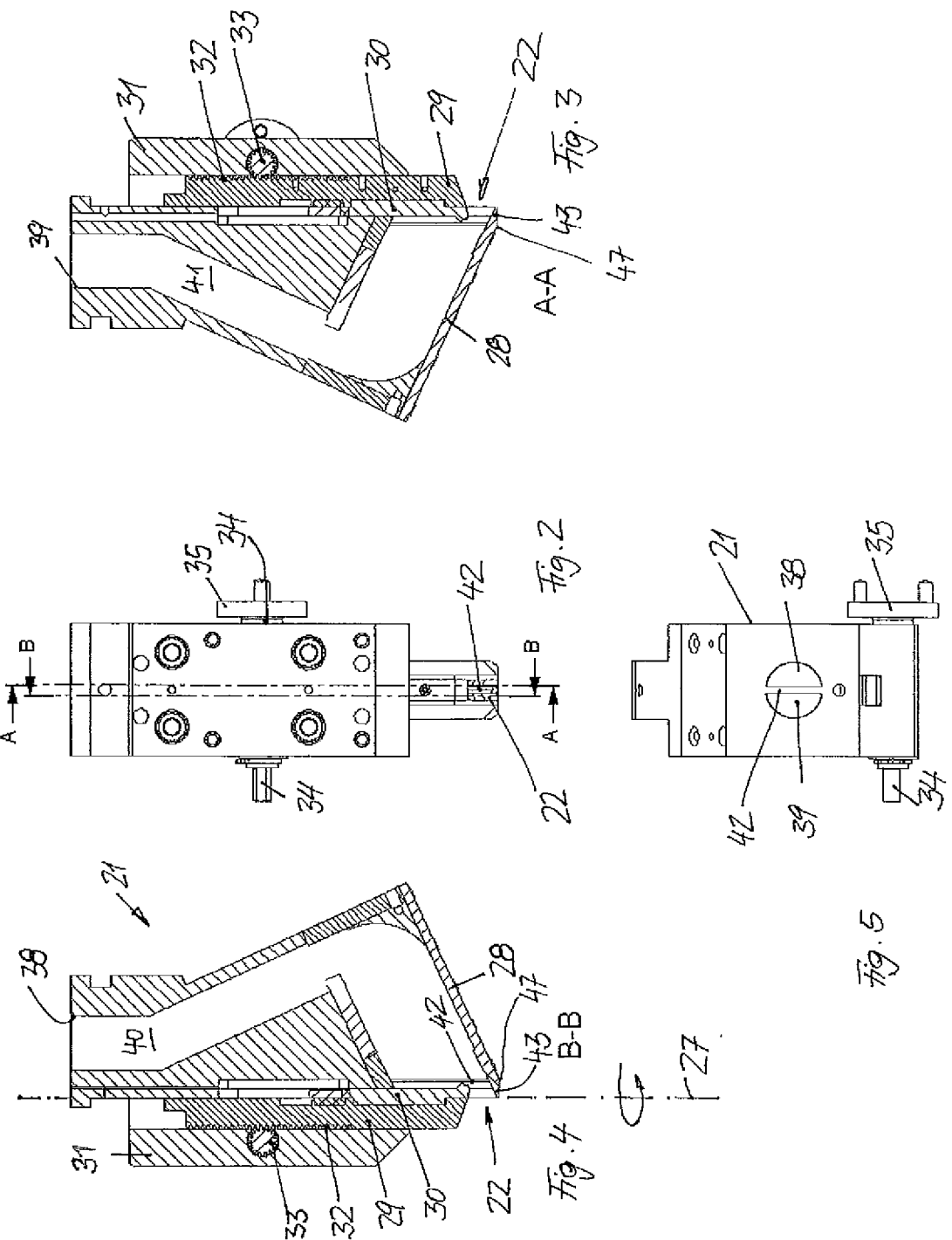

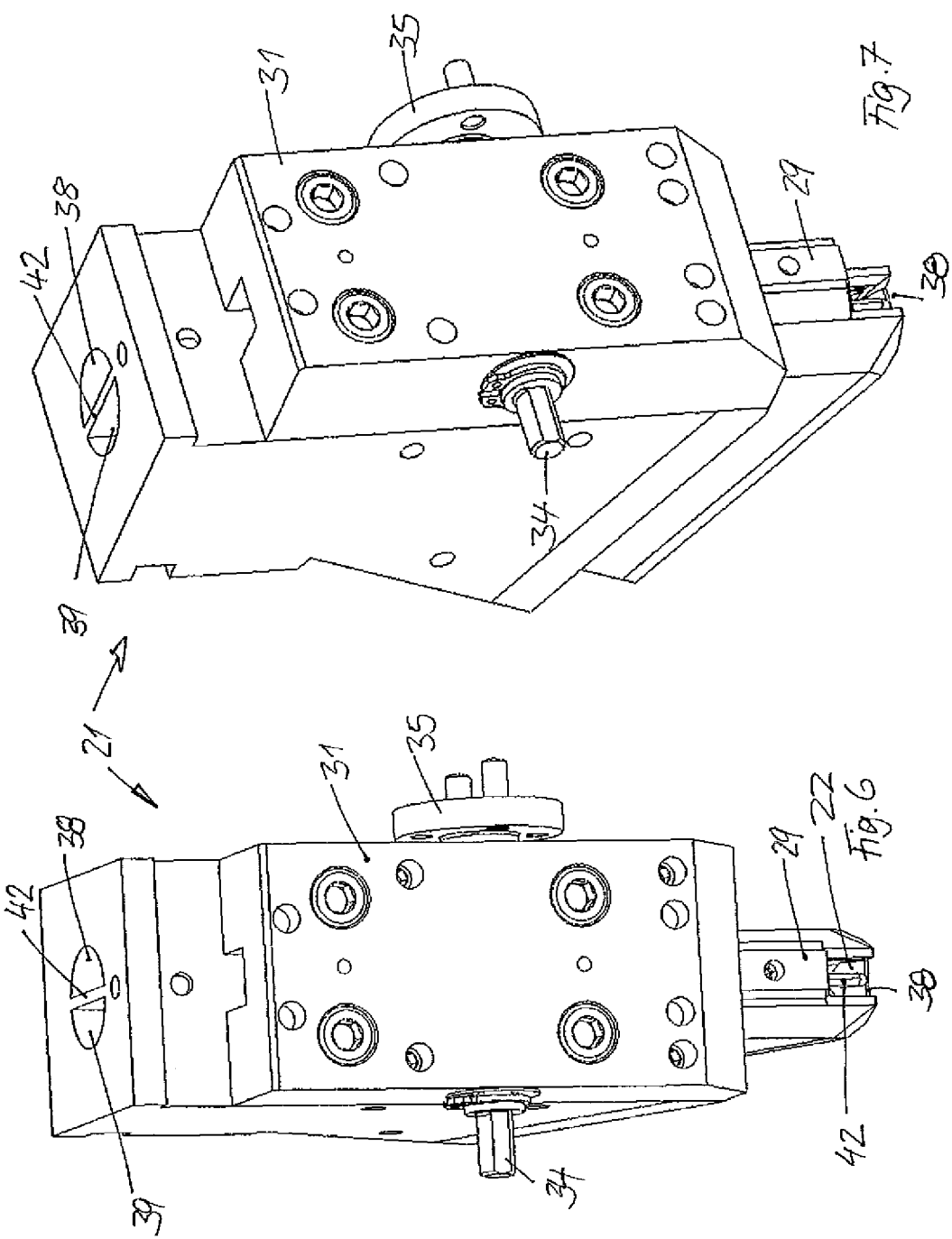

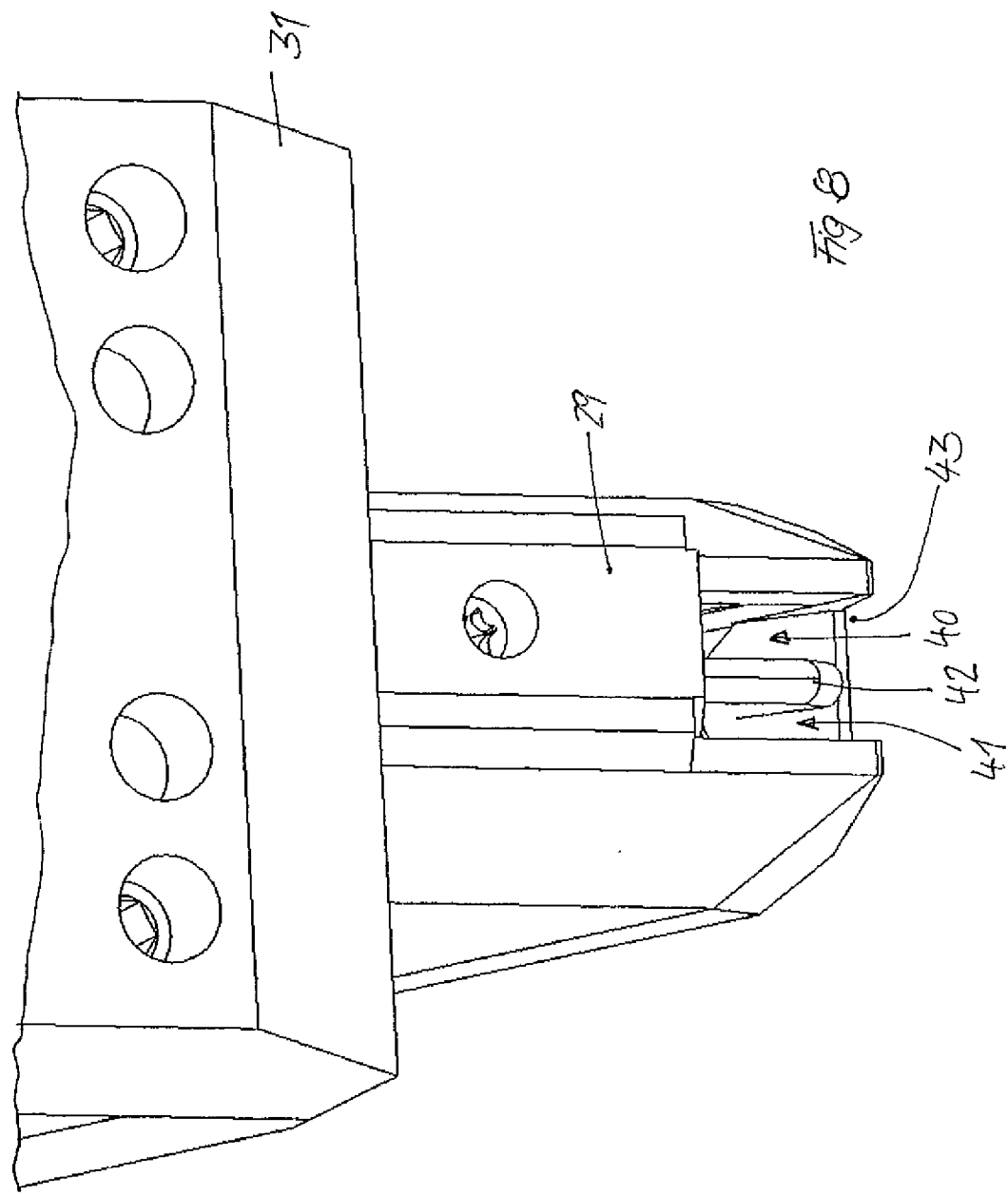

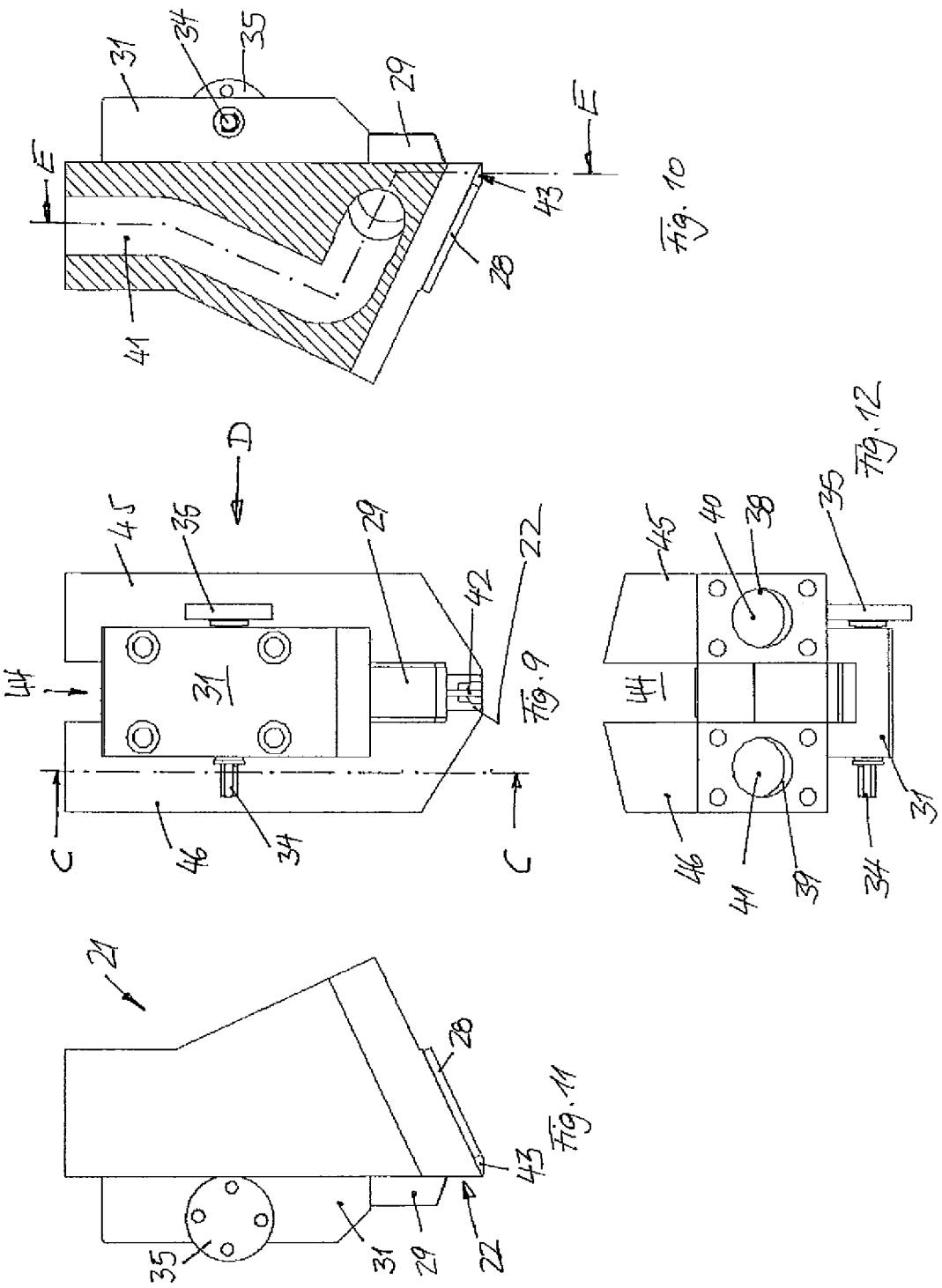

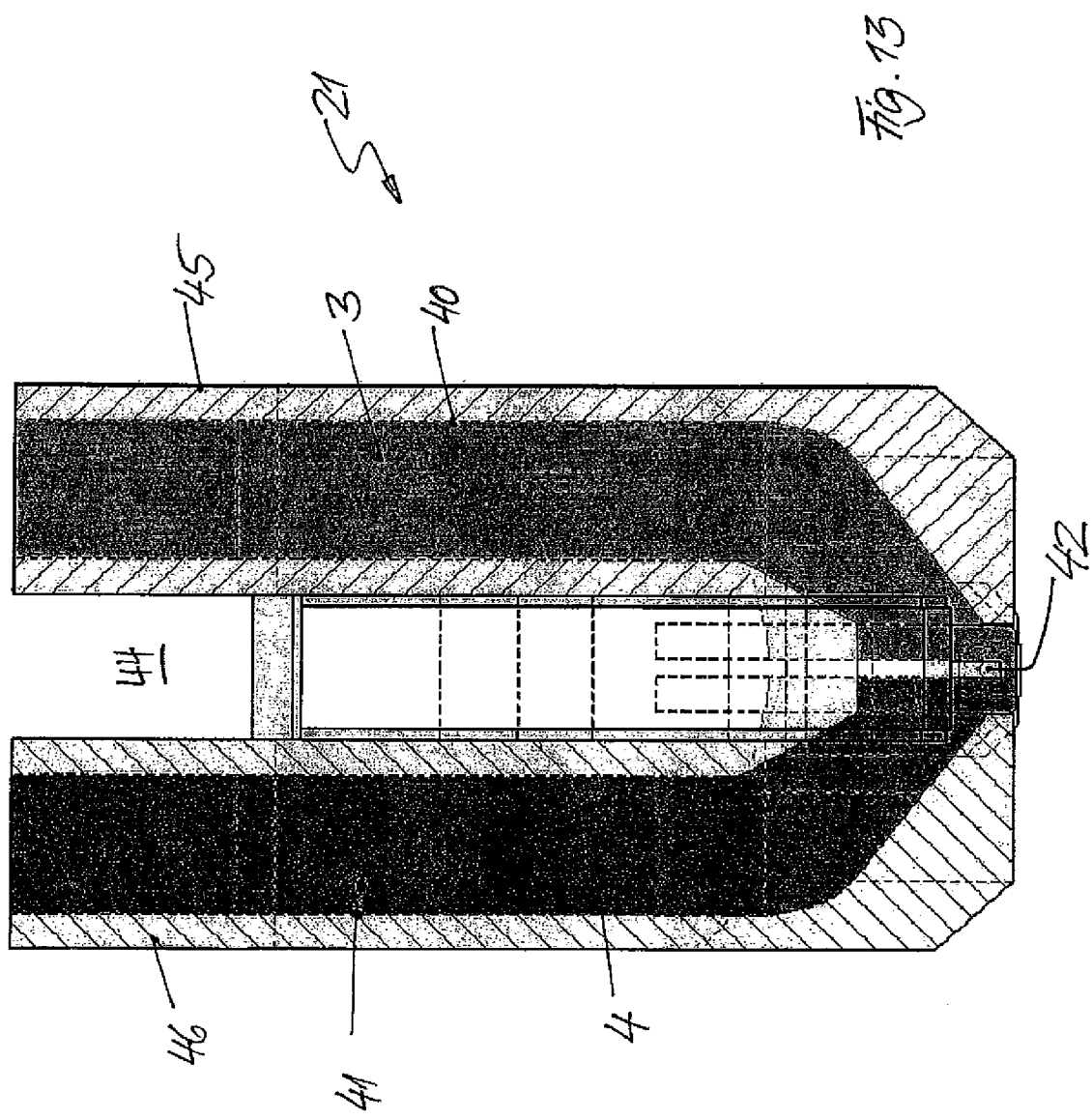

Fig. 20

METHOD FOR PRODUCING AN INSULATING GLASS PANE

The invention relates to a method for producing an insulating glass pane comprising a plastic spacer, wherein two glass panels, which are parallel to each other, have a target distance from each other.

Such a method is known from DE 35 39 877 A1. According to the known method, two glass panels can be combined to form an insulating glass pane in that a two-layer composite strand made of two different substances is injected into the space between the two glass panels, which are kept at a distance, along the entire glass panel edge. The two partial strands, which are connected to each other, each extend from the one glass panel to the other glass panel. Thus there is an inner partial strand comprising a surface facing the interior of the insulating glass pane, and an outer partial strand comprising a surface facing the outer air. One of the two partial strands consists of a substance, which mainly ensures the necessary firm bond of the two glass panels (mostly a hardening two-component adhesive, in particular a Thiokol), while the other partial strand is to ensure a water vapor-tight closure of the insulating glass pane and, consists, e.g., of a polyisobutylene. The inner partial strand furthermore contains a granular or powdery drying agent, in particular molecular sieves, which is able to bind moisture, which is present in the interior of the insulating glass pane.

According to the disclosure in DE 35 39 877 A1, such a composite strand can be produced by means of a nozzle, which has two orifices closely adjacent to each other, to which the different substances are supplied through separate supply channels, or by means of a nozzle, which encompasses only a single orifice, into which, however, two supply channels for both of the different substances lead. According to the disclosure in DE 35 39 877 A1, the nozzle dips in both cases into the space between the two glass panels, which are arranged parallel to each other at a distance and the orifice is oriented opposite to the direction of movement of the nozzle.

DE 35 39 877 A1 also discloses a handling device, by means of which the nozzle and glass panel pair are moved relative to each other. This is a horizontal conveyor, which conveys the glass panel pair in an upright orientation and thereby keeps the glass panels at a predetermined distance. The nozzle which can be displaced parallel to the plane, in which the pane is moved, perpendicular to the conveying direction and which can be pivoted in 90° steps about an axis, which is vertical to the plane of movement of the pane, is attached to the horizontal conveyor.

The injection of the composite strand starts at a corner of the rectangular angles glass panels and ends at the same corner. Upon reaching the other three corners, the nozzle is in each case pivoted by 90°. When injecting the strand along the two edges of the pane, which are parallel to the conveying direction, the nozzle rests while the glass panel pair is moved through the horizontal conveyor. In response to the injection of the strand along the two edges of the pane, which run at right angles to the conveying direction, the glass panel pair rests while the nozzle is moved.

A particularly critical location for the tightness of the insulating glass pane is the corner at which the beginning and the end of the composite strand are located. It is not easy to close the unavoidable joint between the two corners of the strand so as to be water vapor-tight, in particular in the case of glass panels comprising an outline, which is rounded or which deviates in a different manner from the perpendicularity.

WO 91/06740 discloses a proposal for how to improve the tight connection between the beginning and the end of the composite strand extruded between two glass panels, which are kept at a distance.

Due to technological difficulties, methods and devices for producing insulating glass panes by extruding a composite strand between two glass panels, which are parallel to each other, kept at a distance and in which the composite strand serves as spacer as well as for sealing the insulating glass pane, have not been put into practice.

The method disclosed in WO 96/09456 A2, in which a plastic strand, in particular based on polyisobutylene, in which a powdery or granular drying agent is embedded, is applied to a glass panel in that a nozzle is moved along the edge of the glass panel around said glass panel and thereby places the strand emerging from the nozzle onto the glass panel such that the beginning and the end of the strand abut, has been put into practice. The glass panel prepared in this manner is joined with a second glass panel to form an insulating glass pane, wherein the plastic strand is adhered to both glass panels. The abutting surface between the beginning and the end of the strand thereby runs obliquely to the longitudinal direction of the strand from the one glass panel to the other glass panel and the binding pressure is applied to it when the insulating glass pane is pressed to its target size. As is known per se in the case of insulating glass panes comprising metallic spacers, the remaining edge joint is subsequently sealed with a binding sealing compound, e.g. with a Thiokol. Thiokol is a polysulfide. Once the sealing compound, which is injected into the edge joint, has bonded, it establishes the firm bond between the two glass panels of the insulating glass pane. Until then, the thermoplastic sealing compound, in which the drying agent is embedded, simultaneously serves as a spacer.

Improvements of the method described in WO 96/09456 A2 are disclosed in EP 0 823 318 B1 and in EP 0 823 531 B1. Insulating glass panes, which are produced according to this method, are known as TPS® insulating glass panes.

After 15 years, the instant invention now brings considerable progress in the production of TPS® insulating glass panes.

SUMMARY OF THE INVENTION

An insulating glass pane comprising a plastic spacer, wherein two glass panels, which are parallel to each other, have a target distance from each other, is produced according to the invention by forming a composite strand by a temporally and spatially overlapping extrusion of at least two plastic partial strands on a first glass panel along the edge of the glass panel, wherein a first partial strand is made of an adhesive first sealing compound, in which a moisture-binding substance is embedded, and a second partial strand consists of an adhesive, setting second sealing compound. This is done such that the beginning and the end of the composite strand abut and thereby form a frame, that the first partial strand is extruded to the glass panel with a predetermined first target thickness, which is greater than the target distance, and the second partial strand is extruded with a predetermined second target thickness, which is greater than the target distance, that the partial strands are located next to each other in the composite strand and thus directly adjoin each other, and that the first partial strand is located within the frame formed by the second partial strand.

The invention has considerable advantages:

Contrary to the common method for forming TPS® insulating glass panes, not only one strand of a thermoplastic compound, in which a moisture-binding substance is embedded, is applied to a first glass panel, so as to then connect it to a second glass panel to form an insulating glass pane, which must thereafter be sealed with a binding second sealing compound. According to the invention, a composite strand, which comprises a first partial strand made of an adhesive first sealing compound, in which a moisture-binding substance is embedded, and which comprises a second partial strand made of an adhesive, setting second sealing compound, is instead applied to the first glass panel. A separate sealing process, in which, in the case of common TPS® insulating glass panes, the binding second sealing compound is filled into an edge joint of the insulating glass pane only after the joining of two glass panels to form an insulating glass pane, can thus be omitted.

The sealing machine, which is the most extensive machine in a common production line for TPS® insulating glass panes, can be omitted. Devices for purifying and supplying the binding second sealing compound, however, are also required for carrying out the method according to the invention.

No floor space is required for a sealing machine in the insulating glass production line.

The first and the second sealing compound are applied in a common operation.

Even before the two glass panels are joined to form an insulating glass pane, the composite strand is characterized by a greater mechanical stability than a common TPS® strand, which consists only of a thermoplastic first sealing compound, in which a moisture-binding substance is embedded. The two partial strands can mutually support each other in the composite strand. Insulating glass panes, in which the distance of the two glass panels located opposite each other is greater than in the case of common TPS® insulating glass panes, can thus be produced according to the method according to the invention. In insulating glass panes, which are produced according to the invention, the distance between two glass panels located opposite each other in the insulating glass pane can be considerably more than 20 mm. Compared to common TPS® insulating glass panes, such insulating glass panes bring about an improved heat insulation.

A setting sealing compound consisting of two components can be applied to a glass panel at a low temperature as a thermoplastic first sealing compound, in which a moisture-binding substance is embedded. A temperature compensation thus takes place in the composite strand, which has the effect that the first partial strand initially cools down more quickly and thus gains stability, whereas the second sealing compound sets more quickly. In combination, both lead to a rapid mechanical stabilization of the composite strand, which is advantageous for reaching large distances between the glass panels of an insulating glass pane.

According to the method according to the invention, insulating glass panes comprising a plastic spacer can be produced in a more cost-efficient manner than before.

The edge bond of an insulating glass pane produced according to the invention does not have a metallic spacer, which provides an undesired thermal bridge in classic insulating glass panes.

The method according to the invention is suitable for various setting second sealing compounds, that is, which cross-link. In addition to the Thiokol, which has been used most so far, a polyurethane, a silicon or a reactive hotmelt adhesive can also be used as second sealing compound, in particular a reactive hotmelt based on butyl. An isocyanate, e.g., which is contained in the hotmelt in the form of prepolymers and which cross-links by reaction with migrating moisture, is suitable as reactive component of the hotmelt. In particular a compound based on polyisobutylene, in which a powdery drying agent, in particular molecular sieves, is embedded, is suitable as first sealing compound for the purposes of the invention. The first sealing compound preferably also contains a reactive, that is, cross-linking component. The portion thereof is preferably 30% by weight or slightly more than 30% by weight. However, the degree of the cross-linking should be smaller in the case of the first sealing compound than in the case of the second sealing compound.

Preferably, the composite strand is formed of exactly two partial strands. However, it is also possible for a diffusion barrier to be inserted between the first partial strand and the second partial strand. Such a diffusion barrier between the first and the second partial strand makes it possible to also use such substances for the first partial strand and for the second partial strand, which are optimal for their individual main purpose, which, in the case of the first partial strand is the sealing of the insulating glass pane and which, in the case of the second partial strand, is the establishing of a firm bond between the glass panels of the insulating glass pane, but which are not compatible with each other in direct contact. A diffusion barrier can be formed in that a third partial strand made of a third plastic compound, which is compatible with the first plastic compound as well as with the second plastic compound, is formed between the first partial strand and the second partial strand by means of coextrusion.

The target distance of the glass panels of an insulating glass pane according to the invention is achieved by pressing the insulating glass pane. Thereby, the seal of the insulating glass pane is improved at the same time. In response to the pressing, the composite strand is compressed. To avoid that a pressure increase takes place in the glass, with which the insulating glass pane is filled, one of the two glass panels is preferably bent away at a corner from the other glass panel located opposite thereto prior to the joining of the two glass panels to form an insulating glass pane and is held so as to be bent during the joining and pressing, so that an opening remains between the composite strand and the glass panel, which has been bent away. Through this opening a pressure compensation can take place. The bending is reversed only when the two glass panels have reached the target distance away from the bent area, and the insulating glass pane is thus closed completely. The gas encased by the insulating glass pane can be air or a different gas, which is heavier than air, e.g. argon.

The partial strands of the composite strand are preferably extruded at the same time, that is, the extrusion of the partial strands starts at the same time and it also ends at the same time. This facilitates the control of the extrusion process and the movement of one or a plurality of extrusion nozzles along the common edge of the first glass panel, in particular in the area of corners or bent edge sections of the glass panel. In the event that provision is made for a plurality of nozzles for the extrusion of the partial strands, they are preferably moved together relative to the first glass panel, in particular on a common support, because this is easiest for the course of movement. A movement of a nozzle relative to the first glass panel does not only refer to a movement of a nozzle along a resting glass panel, but also a movement of the glass panel along a resting nozzle. The relative movement between the nozzle and the glass panel can at the same time also include the movement of the glass panel and the movement of the nozzle, in particular in the case of glass panels comprising a bent edge section.

It is possible and advantageous to extrude the partial strands by means of a multiple port nozzle, which has ports for different plastic compounds. In comparison with the alternative of providing a plurality of nozzles for the extrusion of the partial strands, this solution is preferred. Separate channels lead from the ports for the first sealing compound, for the second sealing compound and, if applicable, for a third sealing compound, to a common orifice or to a plurality of orifices of the nozzle located next to each other. Both possibilities have advantages. In the event that the multiple port nozzle has only a single orifice, this facilitates the design of the multiple port nozzle and the joining of the partial strands to form a composite strand, which should take place without interruptions, if possible. However, in the event that the multiple port nozzle has a plurality of orifices located next to each other, this opens a possibility of controlling the different partial strands separately, in particular by means of sliders, by means of which the opening cross section of the orifices can be varied. In the event that the nozzle has only a single orifice, the opening cross section of this nozzle can be varied for the composite strand as a whole by means of a single slider and a controlling influence can thus be exerted on the extrusion process. However, in the event that the nozzle has only a single orifice, the clear cross section thereof can also be controlled by means of two sliders, which are located next to each other and which can be adjusted separately, in such a manner that the two partial strands can be varied separately in response to the extrusion.

In general, the plastic compounds, which are possible for the first partial strand and for the second partial strand, have different processing temperatures. It is thus advantageous to guide them in separate channels to the orifices or—in the event that there is only a single orifice—just up to the common orifice. In the event that a multiple port nozzle is used, measures are preferably taken to impede the heat transfer between the channels leading from the ports to the orifice or to the orifices, respectively, so as to maintain the desired processing temperature on the way to the orifice. These measures can be, e.g., that walls between the channels consist of a plastic, which conducts the heat poorly and/or that the massive cross sections between the channels, which are available for a heat transport, are kept small by means of cavities, which are provided in the nozzle body or by means of sections or spaces, which are exposed to air.

Preferably, a nozzle or a multiple port nozzle, respectively, comprising a variable orifice cross section is used and the orifice cross section is controlled in a time interval at the beginning of the extrusion process and in a time interval at the end of the extrusion process such that the thickness of the composite strand or of its partial strands, respectively, which emerge from the nozzle or from the multiple port nozzle, respectively, is increased to the target thickness at the beginning on a path L starting from zero or starting from a minimum thickness and is reduced complementary thereto at the end of the extrusion process on the same path L from the target thickness D to zero, so that the beginning and the end of the composite strand or of its partial strands, respectively, overlap on this path. This leads to an optimal seal between the beginning and the end of the multiple strand, which is improved even more by the subsequent pressing process, because the abutting surfaces between the beginning and the end of the composite strand or of its partial strands, respectively, are pressed on top of each other. Details relating to this preferred further development of the invention are disclosed in WO 96/09456. The content of WO 96/09456 A2 is hereby included into the disclosure of the instant invention by reference.

In addition, it is preferred that a film of the respective plastic compound is applied to the first glass panel by means of the nozzle or by means of the multiple port nozzle, respectively, before the thickness of the composite strand or of the partial strands, respectively, emerging from the nozzle or multiple port nozzle, respectively, is increased to the target thickness according to the above-mentioned refinement of the invention (see claim 16). This film eliminates an otherwise possible risk of a small leakiness at the beginning of the abutting surface of the composite strand or of its partial strands, respectively, which rises like a ramp. This film can be very thin, it is preferably embodied so as not to be thicker than 0.3 mm and is preferably not longer than a few cm. It is best when the film is embodied to have a thickness of only 0.1 mm to 0.2 mm. Details relating to the advantages of this film and how it can be produced easiest are disclosed in EP 0 823 531 B1. The content of EP 0 823 531 B1 is hereby included into the disclosure of the instant invention by reference.

A further refinement of the invention, in which the paths L, on which the beginning and the end of the individual partial strands overlap, are offset against each other in longitudinal direction of the composite strand, is particularly advantageous. The abutting surface between the beginning and the end of the first partial strand is then not aligned with the abutting surface between the beginning and the end of the second partial strand. Moisture, which could expand along the abutting surface between the beginning and the end of the second partial strand in an unfavorable case, would then abut on a massive wall of the first partial strand, which contains the moisture-binding substance, but could not abut on the abutting surface between the beginning and the end of the first partial strand.

While the abutting surfaces between the beginning and the end of the partial strands are preferably offset against each other, the beginning of the films made of the plastic compounds is preferably placed at the same part of the circumference of the glass panel, so that the application of the films and the movement of the nozzles provided for this or of the multiple port nozzle provided for this, respectively, can be started at the same time. So as to nonetheless obtain an offset between the abutting surfaces between the beginning and the end of the partial strands, provision can advantageously be made for two sliders next to each other, which handle the opening cross sections for the two partial strands in a correspondingly chronologically staggered manner.

The partial strands can be extruded to the first glass panel, while it is arranged in an upright orientation and being offset against the vertical line by several degrees on a horizontal conveyor. This is how the production of the known TPS® insulating glass panels proceeds. In a refinement of the invention, the partial strands can be extruded on the first glass panel, while it is located horizontally. This provides for the production of insulating glass panes with a particularly large distance between the glass panels.

Preferably, the composite strand or its partial strands, respectively, is/are applied to the first glass panel such that the composite strand is flush with the edge of the first glass panel, at least outside of corner areas of the first glass panel. The available format of the glass panels is then used optimally. In addition, it is advantageous that the composite strand bulges slightly outwards in response to the pressing of the insulating glass pane, thus resulting in an edge protection of the insulating glass panes, which facilitates the subsequent handling thereof and which minimizes the risk of chipping at the glass edges.

Exemplary embodiments of the invention are described in the enclosed drawings. The same or corresponding parts are identified with corresponding reference numerals in the examples.

BRIEF DESCRIPTION OF THE DRAWINGS

FIG. 2 shows a nozzle for the extrusion of a composite strand in a front view, FIG. 3 shows the section A-A through the nozzle from FIG. 2, FIG. 4 shows the section B-B through the nozzle in FIG. 2, FIG. 5 shows the nozzle from FIG. 2 in a top view, FIG. 6 and FIG. 7 show the nozzle from FIG. 2 in different oblique views, FIG. 8 shows the detail of an enlarged section from FIG. 6, namely the area of the orifice of the nozzle, FIG. 9 shows a second exemplary embodiment of a nozzle for the extrusion of a composite strand in a front view, FIG. 10 shows the section C-C through the nozzle from FIG. 9, FIG. 11 shows the side view seen in direction D onto the nozzle from FIG. 9, FIG. 12 shows the nozzle from FIG. 9 in a top view, FIG. 13 shows the section E-E of the nozzle according to FIG. 10, FIG. 20 shows a modification for the device from FIG. 1, and FIG. 21 illustrates the assembly of an insulating glass panel, which is produced according to the invention.

DETAILED DESCRIPTION

Figure 1:
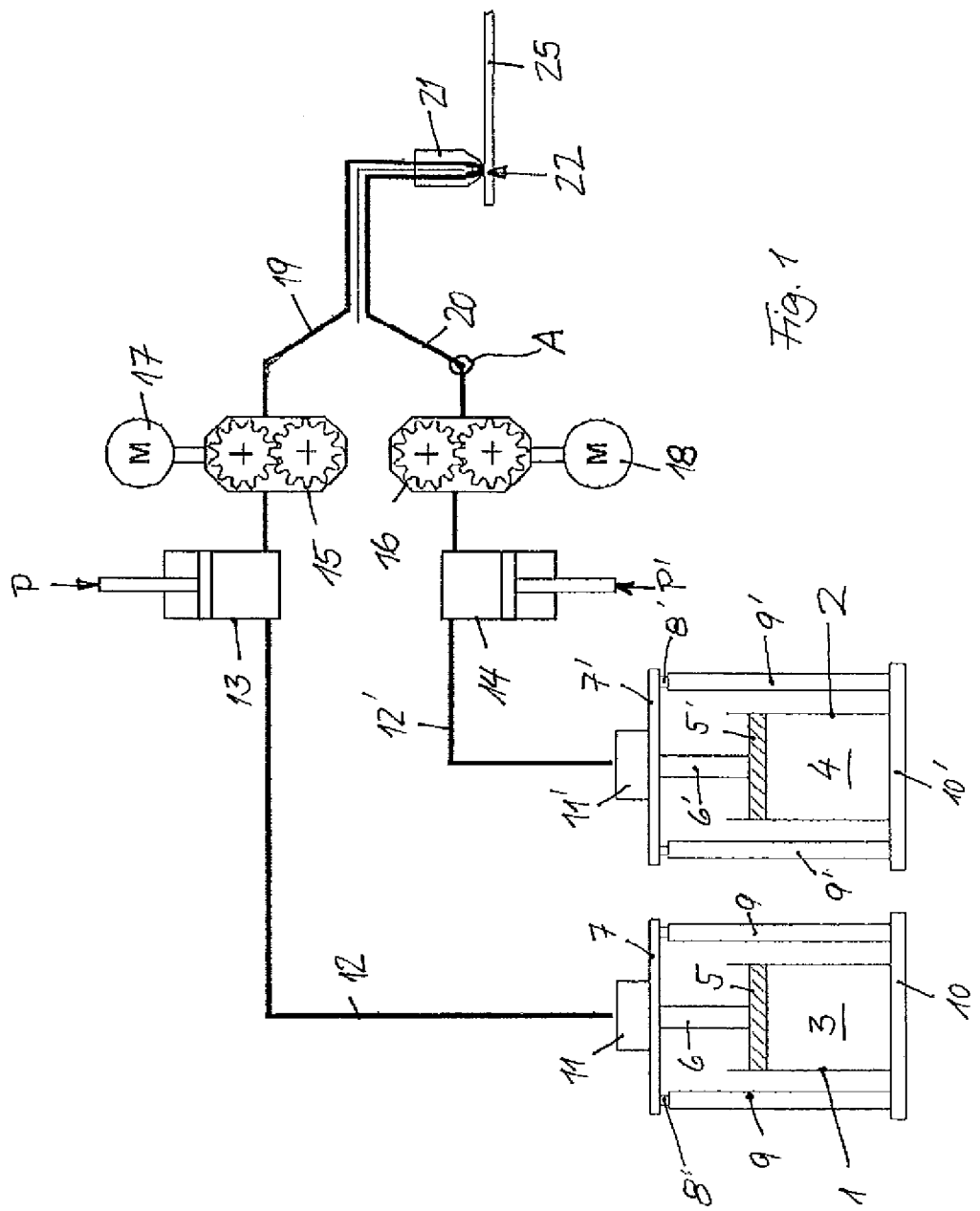
FIG. 1 schematically shows the design of a device for applying a composite strand onto a glass panel.

FIG. 1 shows a container 1 comprising an adhesive, thermoplastic first sealing compound 3 and a container 2 comprising second sealing compound 4 that is adhesive and setting. The two containers 1 and 2 are barrels, e.g., the covers of which have been removed. A follow-up plate 5 lies on the first sealing compound 3 in the container 1. A rod 6 leads vertically upwards from the follow-up plate to a traverse 7, which does not only connect the rod 6, but also two piston rods 8, which belong to two hydraulic cylinders 9, which are anchored on a base plate 10, on which the container 1 is located. By retracting the piston rods 8 into the hydraulic cylinder 9, the traverse 7 presses the follow-up plate 5 onto the supply of the first sealing compound 3, which is located in the container and which is then pressed through an opening in the follow-up plate 5 into a pump 11, which is located above the follow-up plate 5, which conveys the first sealing compound 3 into a line 12.

The second sealing compound 4 is located in the second container and is conveyed out of it in the same manner as the first sealing compound 3 is conveyed out of the first container 1. The devices used for this are thus identified with the same reference numerals, provided with a line.

The barrel pump 11 pumps the first sealing compound 3 into an intermediate storage 13, which is under a system pressure P and which is connected to the input side of a gear pump 15, which is driven by means of an electric motor 17, which is preferably a dc motor.

The barrel pump 11' pumps the second sealing compound 4 through the line 12' into an intermediate storage 14, which is under a system pressure P' and which is connected to the input side of a second gear pump 16, which is driven by means of an electric motor 18. Advantageously, the two motors 17 and 18 are synchronized with each other.

Figure 14:
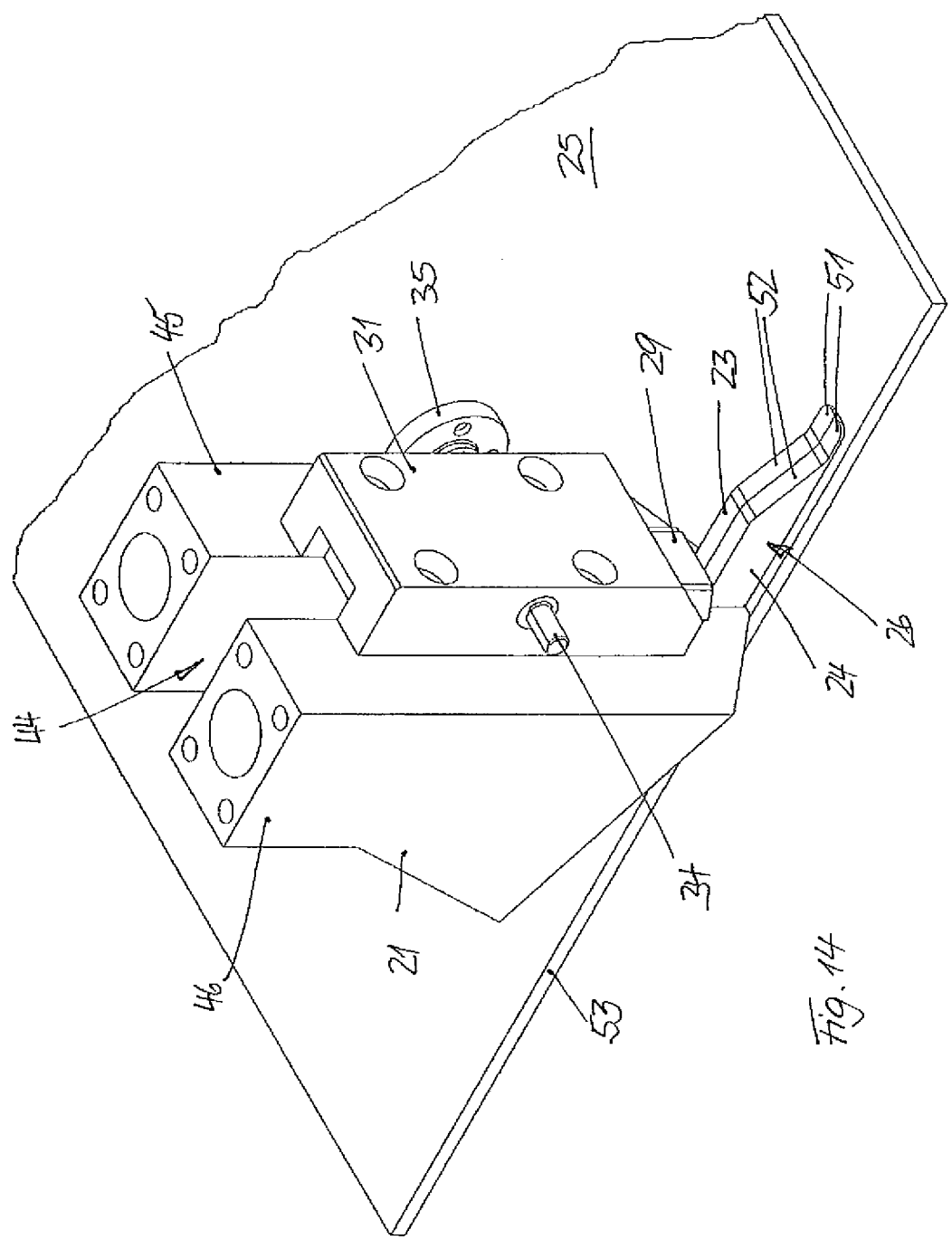
FIG. 14 shows the nozzle from FIG. 9 in response to the extrusion of a composite strand onto a glass panel.

The gear pump 15 conveys the first sealing compound 3 through a line 19 into a nozzle 21. The other gear pump 16 also conveys the second sealing compound 4 through a line 20 into the nozzle 21, from the orifice 22 of which two partial strands 23 and 24 (see FIG. 14) emerge and which are applied directly next to each other onto a glass panel 25, on which they form a composite strand 26.

The nozzle 21 illustrated in FIGS. 2 to 8 is attached to a non-illustrated support, which can be rotated about an axis 27. The nozzle 21 has a bottom 28, which runs obliquely relative to the axis of rotation 27 and which ends at the axis of rotation 27 and limits the lower edge of the orifice 22 of the nozzle 21. The orifice 22 has a substantially rectangular opening cross section. The axis of rotation 27 runs in the center of the orifice 22.

Figure 15:
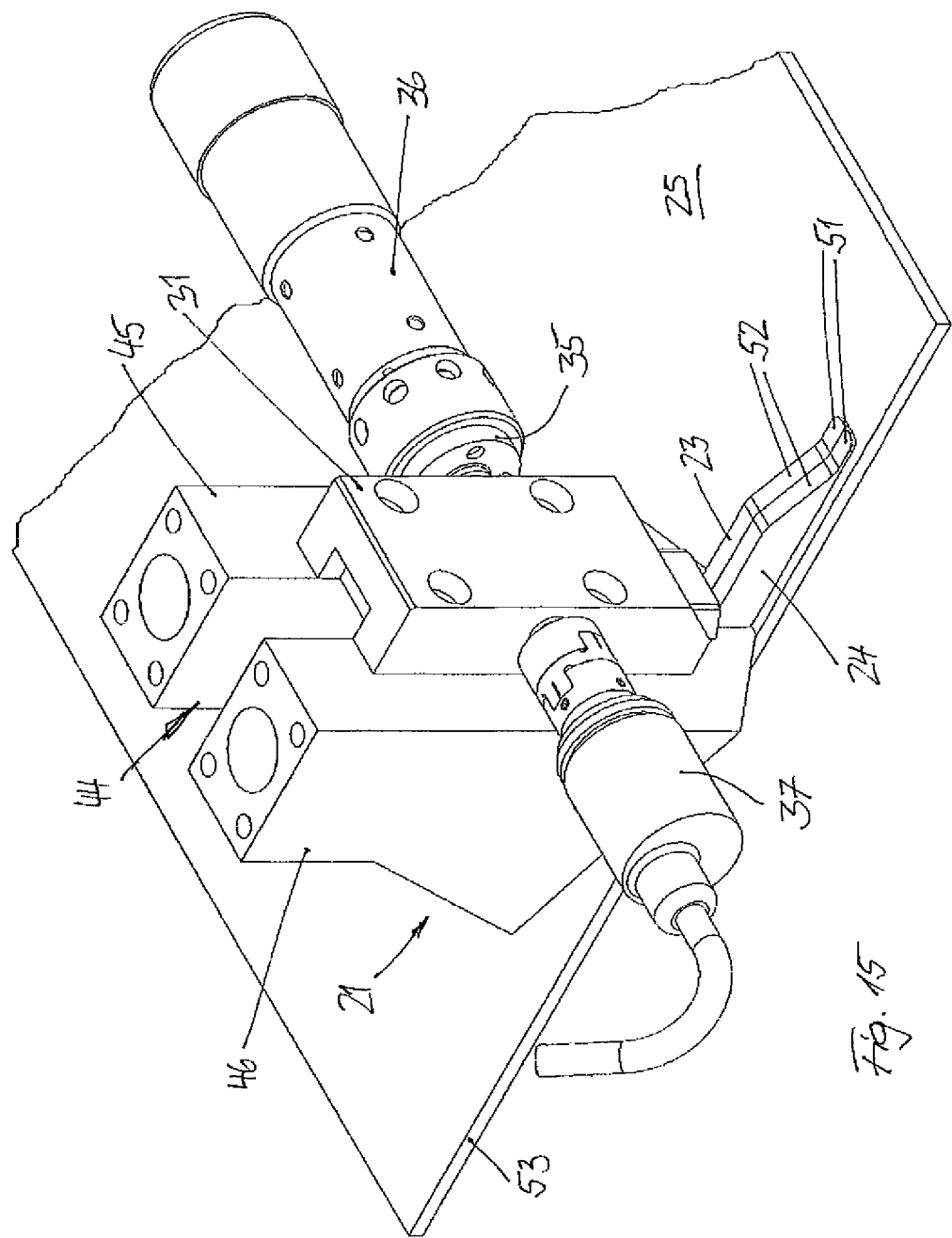
FIG. 15 shows the nozzle from FIG. 14, supplemented with a drive for the slider of the nozzle and with an angle encoder.

To close the orifice 22, provision is made for a slider 29, which is arranged so as to be exchangeable between a wall 30, which runs parallel to the axis of rotation 27, and a removable counter support 31, which is screwed to the body of the nozzle 21. The slider 29 is guided parallel to the axis of rotation 27 so as to be displaceable in the direction thereof between the wall 30 and the counter support 31. To be able to displace it, it is provided with a cogging 32, which cogs with a bevel 33, which is located on a shaft 34, which passes through the counter support 31. A disk 35, to which a servomotor 36 can be attached, which is illustrated in FIG. 15, for example, is located on the shaft 34. The servomotor 36 drives the shaft 34 and with it the bevel 33. An incremental position encoder 37, which is illustrated in FIG. 15, e.g., and which monitors the position of the slider 29 and which supplies an input signal for the control of the servomotor 36, can be installed at the other end of the shaft 34, on the side of the nozzle 21 facing away from the disk 35.

At its upper side, the nozzle 21 has a port 38 for the first sealing compound 3 and a port 39 for the second sealing compound 4. Two channels 40 and 41, which are separated from each other by means of a partition wall 42, lead from the ports 38 and 39 to the orifice 22. The partition wall 42 ends shortly in front of the orifice 22, so that the two partial strands 23 and 24 are still brought together to form a composite strand 26 having a rectangular cross section, on the remaining path to the orifice 22.

Due to the fact that the bottom 28 of the nozzle 21 runs obliquely to the axis of rotation 27 and the nozzle 21 is oriented relative to the glass panel 25 such that the axis of rotation 27 is positioned vertically on the glass panel 25, the bottom 28 also runs obliquely to the glass panel 25, to which the nozzle 21 is attached prior to the onset of the extrusion process.

As can be seen in particular by means of FIGS. 4 and 8, the bottom 28 ends shortly in front of the outlet plane of the orifice 22, in which the axis of rotation 27 is located, so that a small opening 43, which is oriented directly against the glass panel 25, is still available even if the slider 29 is lowered completely. This opening 43 serves the purpose of already applying a film made of the sealing compounds 3 and 4 onto the glass panel 25 at the onset of the extrusion process, prior to the opening of the slider 29, which will be explained in more detail by means of FIGS. 15 and 16.

The exemplary embodiment illustrated in FIGS. 9 to 15 differs from the exemplary embodiment illustrated in FIGS. 2 to 8 in that the ports 38 and 39 are located on two blocks 45 and 46 of the nozzle 21, which are separated from each other by means of an air gap 44. The channels 40 and 41 for the first sealing compound 3 and for the second sealing compound 4 run in these blocks 45 and 46 on the largest part of their length. The two channels 40 and 41 are brought together only shortly in front of the orifice 22, as is illustrated in FIGS. 10 and 13. The channels 40 and 41 are thermally insulated against each other for the most part by means of the air gap 44 between the two blocks 45 and 46, so that different processing temperatures, which the two sealing compounds 3 and 4 might have, can be maintained for the most part up to the location, where the two channels 40 and 41 meet. Incidentally, the exemplary embodiment illustrated in FIGS. 9 to 15 corresponds to the exemplary embodiment illustrated in FIGS. 2 to 8.

FIG. 15 shows the nozzle 21 during the extrusion process. The nozzle 21 is used as follows:

The nozzle 21 is lowered onto the glass panel 25, which is located in a horizontal position, e.g., such that the orifice 22 is located close to the edge of the glass panel 25, but at some distance from a corner of the glass panel 25. When attaching the nozzle 21 to the glass panel 25, the slider 29 is initially in its closed position. The nozzle 21 is then moved parallel to the edge 44 of the glass panel 25 along said edge, namely in a direction opposite to the orifice 22. The first sealing compound 3 and the second sealing compound 4 are thereby supplied to the nozzle 21 by means of the gear pumps 15 and 16. In a first phase of the movement, the slider 29 is still in its closed position. In this phase, the sealing compounds 3 and 4 can escape only from the small opening 43 of the nozzle 21, which is oriented downwards, so that only a thin film 51, which needs to be only 1 cm or 2 cm long, is produced in this first phase on the glass panel 25. In a subsequent second phase, the slider 29 is opened steadily, preferably at the same speed, until the target thickness D of the composite strand 26 has been reached. In this second phase, the thickness of the composite strand increases to a correspondingly steady extent, while forming a ramp 52, until the target thickness D has been reached. This ramp 52 extends across a predetermined path L.

The nozzle 21 is now guided parallel to the glass panel 25 along the edge thereof around it and thereby deposits a composite strand 26 having a constant cross section and constant thickness D on the glass panel 25. At the corners of the glass panel 25, the nozzle 21 is in each case rotated about its axis of rotation 27, namely by an angle, which corresponds to the angle of the corner. For the most part, the angle is a right angle. However, the nozzle 21 can also be moved along an edge of a glass panel 25, which is bent in any manner, wherein the nozzle 21 is then rotated as a function of the bending.

Finally, the nozzle 21 approaches its initial position again. It is moved further in an unchanged manner, until its lower edge 47 reaches the lower end of the ramp 52. Due to the oblique course of the bottom 28 of the nozzle 21, the angle of which is chosen to be slightly larger than the angle, with which the ramp 52 rises, the end wall 28 does not come into a two-dimensional contact with the ramp 52. In the further course of the movement of the nozzle 21, the nozzle is now lifted from the glass panel 25 in a controlled manner such that its lower edge 47 moves along the ramp 52.

Simultaneously and synchronously thereto, the slider 26 is pushed forward steadily; it closes the orifice 22 when the lower edge 47 of the nozzle 21 has reached the upper end of the ramp 52. A wedge-shaped end section 48 of the composite strand 26 is formed in this manner, which is designed complementary to the ramp 52 and which is located on the ramp 52, see FIG. 17. The gear pumps 15 and 16 are also shut down when the slider 29 is closed and the nozzle 21 is lifted from the formed composite strand 26.

The production of the composite strand 26 on the glass panel 25 can take place automatically, for example in a program-controlled manner, when the control program knows the shape of the glass panel from a production planning, or is controlled by means of sensors, which scan the contour of the glass panel 25 during the extrusion process.

Due to the fact that the two sealing compounds 3 and 4 are still joined in the nozzle 21, a composite strand 26, in which the two partial strands 23 and 24 are connected in a two-dimensional manner across their entire thickness, already emerges from the orifice 22 of the nozzle 21.

The mode of operation of the nozzle 21 of the exemplary embodiment in FIGS. 2 to 8 resembles the above-described mode of operation.

Figure 16:
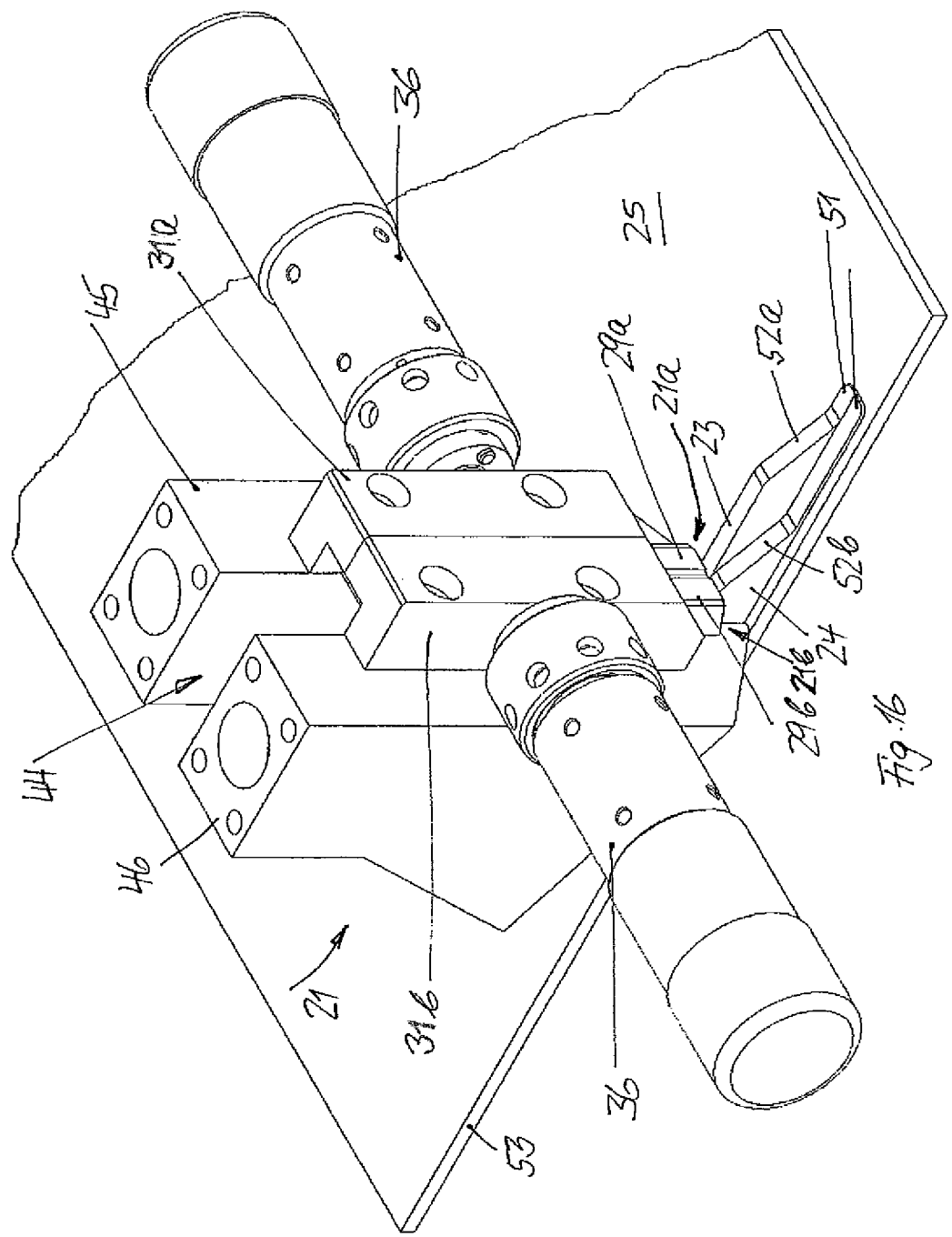
FIG. 16 shows a third exemplary embodiment comprising a nozzle pair during the extrusion of a composite strand onto a glass panel, wherein the two partial strands of the composite strand are offset.

The exemplary embodiment illustrated in FIGS. 16 to 19 differs from the exemplary embodiment illustrated in FIG. 15 in that provision is made for a nozzle pair 21, which encompasses two nozzles 21a and 21b, which can be displaced relative to each other vertically to the glass panel 25 and each of which has a slider 29a and 29b, which can be adjusted separately, so that the formation of the partial strands 23 and 24 can be controlled separately from each other, e.g., in the manner as is illustrated in FIG. 16: as in the example according to FIG. 15, the extrusion process begins with a film 51 made of the two sealing compounds 3 and 4 is formed on the glass panel 25 by means of the sliders 29a and 29b in their closed position. However, as a result, the slider 29b is moved into its open position later than the slider 29a, so that a first ramp 52a is formed from the first sealing compound 3 and a second ramp 52b is formed from the second sealing compound 4, whereby the two ramps 52a and 52b are offset against each other. In the last phase of the extrusion process, the slider 29a is accordingly closed sooner than the slider 29b, wherein the movement of the corresponding slider 29a or 29b, respectively, for each of the partial strands 23 and 24 takes place complementary to the position and shape of the ramps 52a and 52b, each comprising their own servomotor 36, as is already described for the composite strand 26 in FIG. 15.

Figure 17:
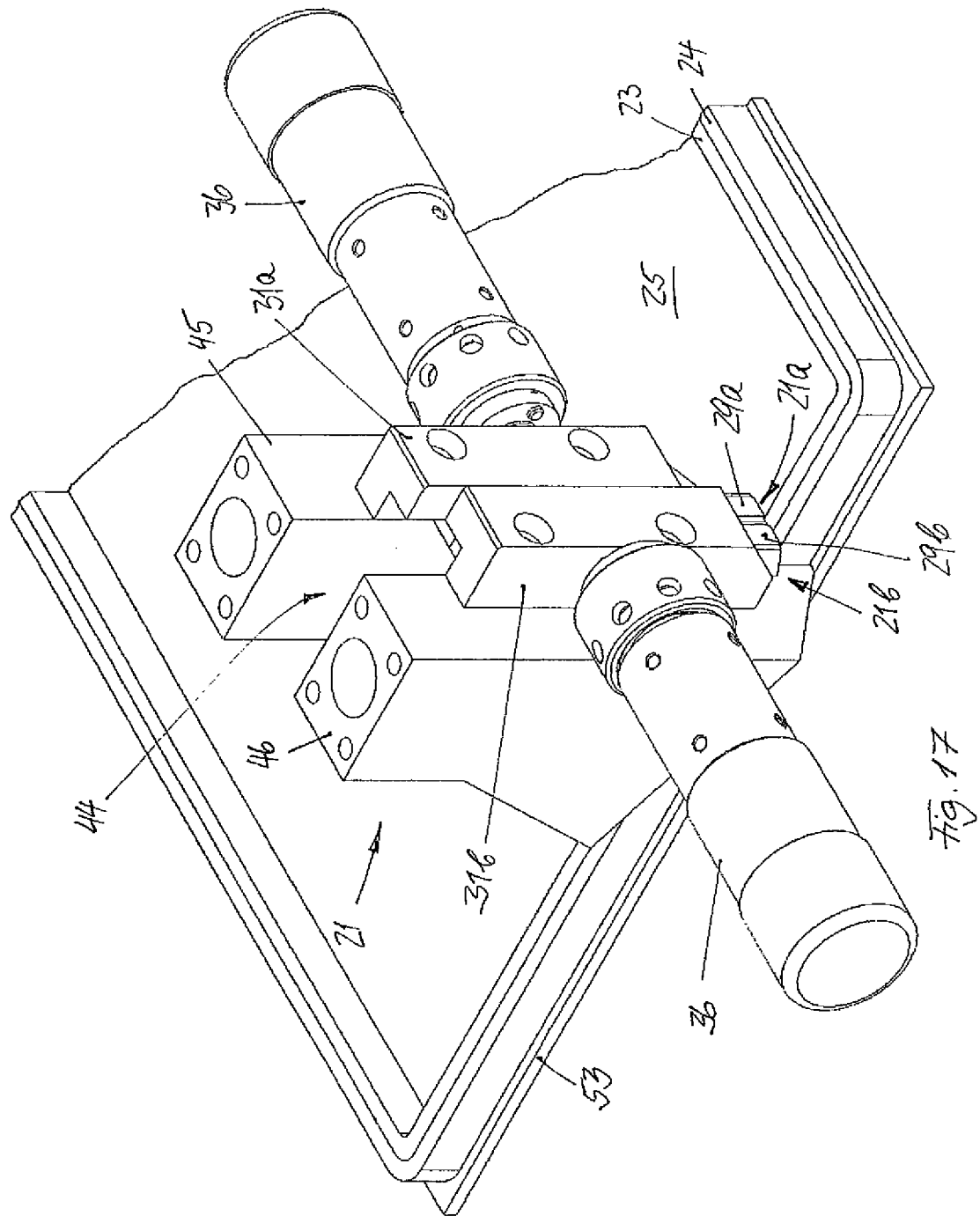
FIG. 17 shows the nozzle pair from FIG. 16 after the end of the extrusion process of the first partial strand and prior to reaching the ramp of the second partial strand.

Initially, the nozzle 21a reaches the ramp 52a of its partial strand 23, moves along the ramp 52a, wherein it continuously moves away from the glass panel 25 and the slider 29a continuously closes the nozzle 21a until the slider 29a, upon reaching the upper end of the ramp 52a, has reached its closed position with the nozzle 21a and the nozzle 21a disengages from the partial strand 23. This moment is illustrated in FIG. 17.

Figure 18:
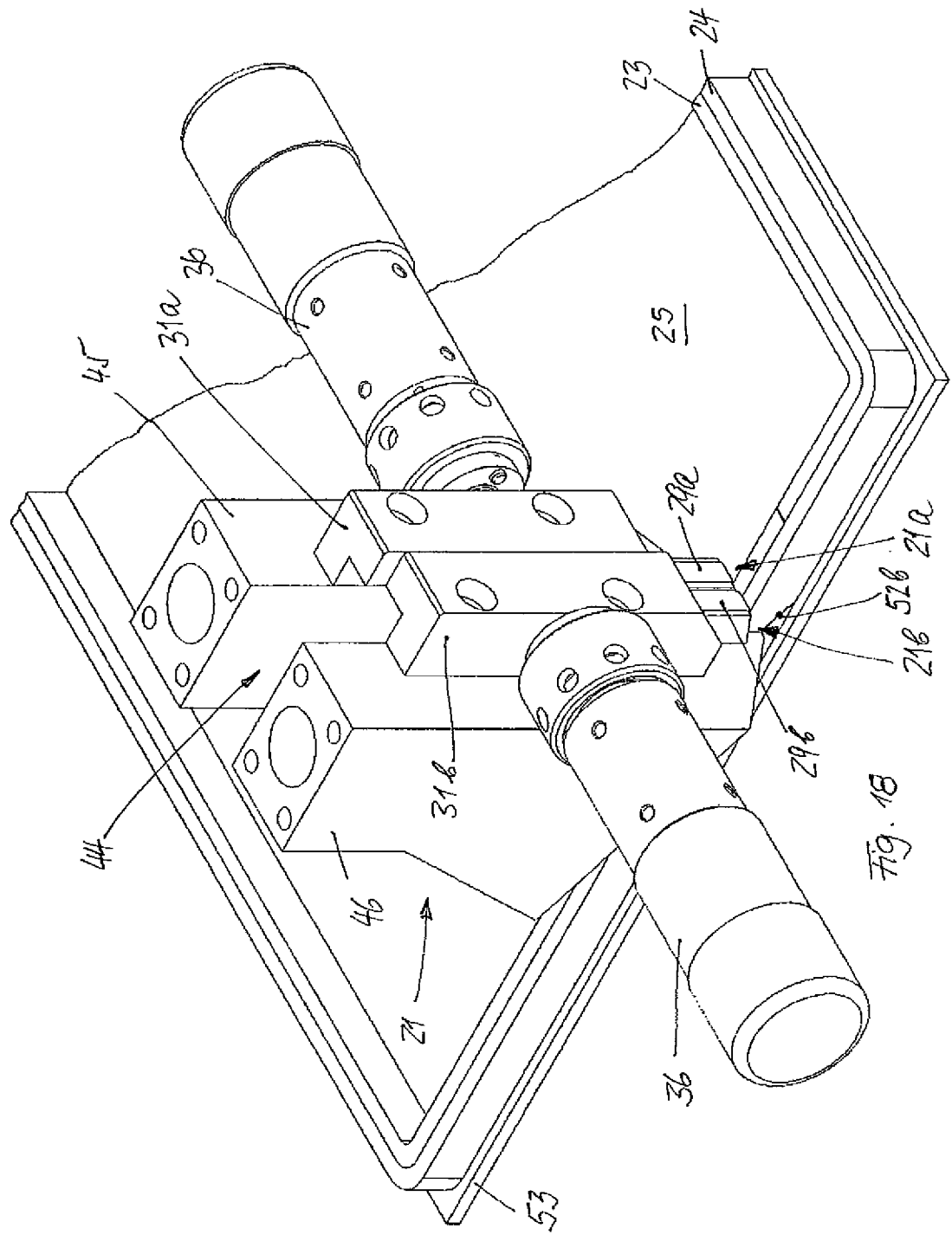
FIG. 18 shows the nozzle pair from FIG. 16 after the end of the extrusion process of the first partial strand and during the movement along the ramp of the second partial strand.

The second nozzle 21*b* subsequently reaches the ramp 52*b* of the second partial strand 24 and moves along the ramp 52*b* while continuously closing the slider 29*b*. This is illustrated in FIG. 18.

Figure 19:
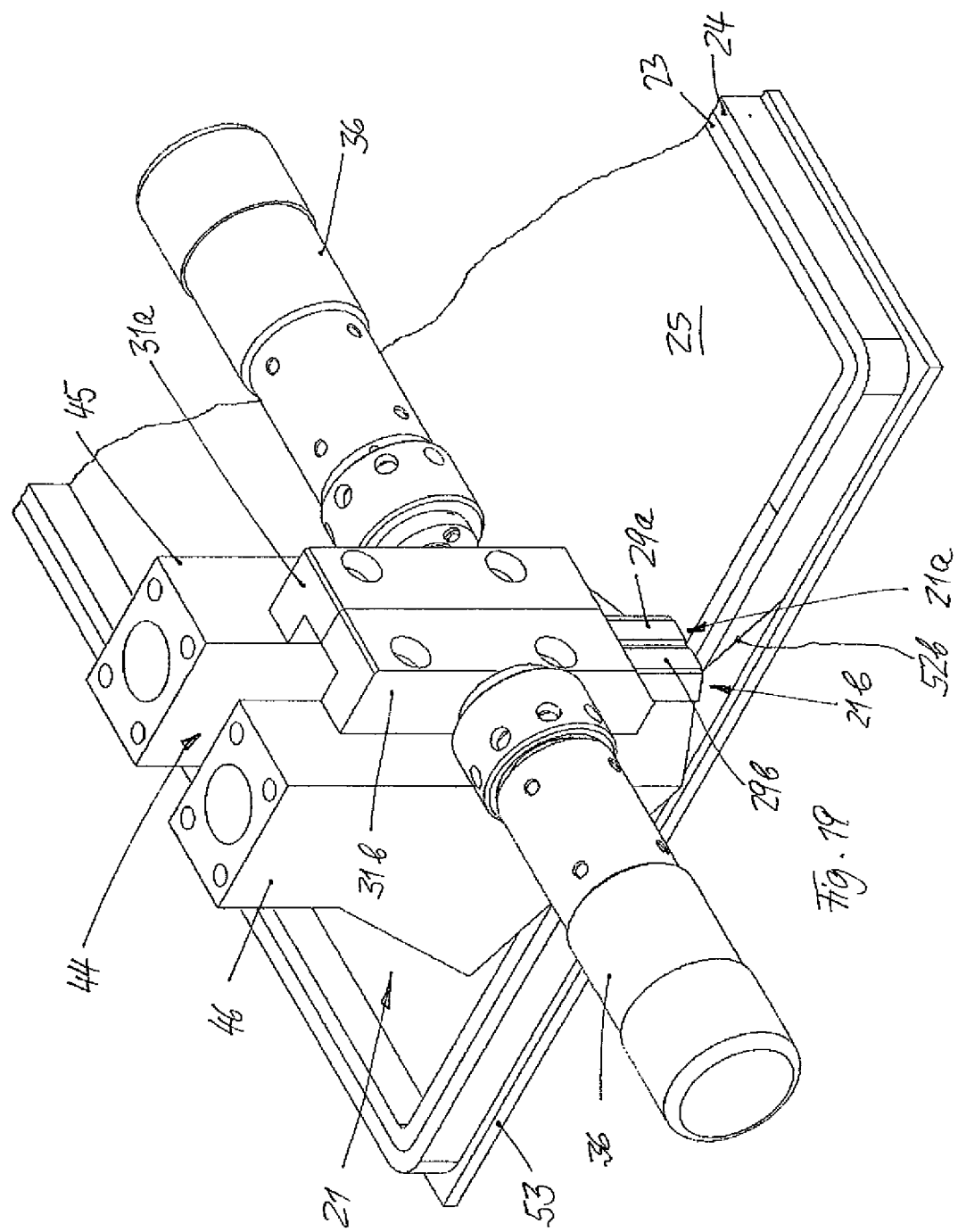
FIG. 19 shows the nozzle from FIG. 16 at the end of the extrusion of the second partial strand of the composite strand.
Figure 27:
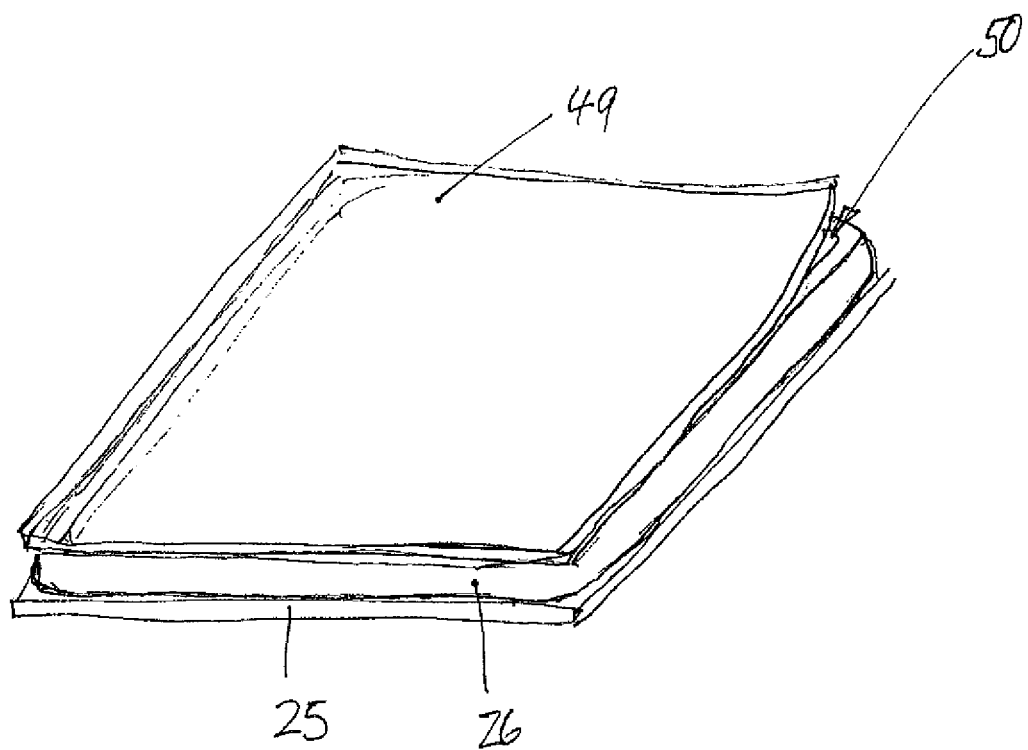

Finally, the second nozzle 21*b* reaches the upper end of the ramp 52*b* and its slider 29*b* reaches its closed position at the same time and the second nozzle 21*b* disengages from the partial strand 24. This point in time is illustrated in FIG. 19.

Once the sliders 29*a* and 29*b* reach their closed position, the supply of the sealing compound 3 or 4, respectively, to the respective nozzle 21*a* or 21*b*, respectively, is interrupted by shutting down the gear pumps 15 and 16 (see FIG. 1).

In the example illustrated in FIG. 1, both sealing compounds 3 and 4 are assumed as being a single component. However, it is also possible, e.g. for the sealing compound, which is to effect the firm bond of the glass panels in the insulating glass pane, to use a two-component adhesive, such as a Thiokol, e.g. The two components of a two-component sealing compound must be mixed with each other before they are supplied to the nozzle 21 or to one of the two nozzles 21*a* or 21*b*. It shall be assumed that a two-component sealing compound, which is formed from the two components 4' and 4", is to be processed instead of the one-component sealing compound 4. In FIG. 1, the part of the device from the container 2 to a connecting point A, which is located between the gear pump 16 and the nozzle 21, would then have to be replaced with the device illustrated in FIG. 20.

Figure 20:
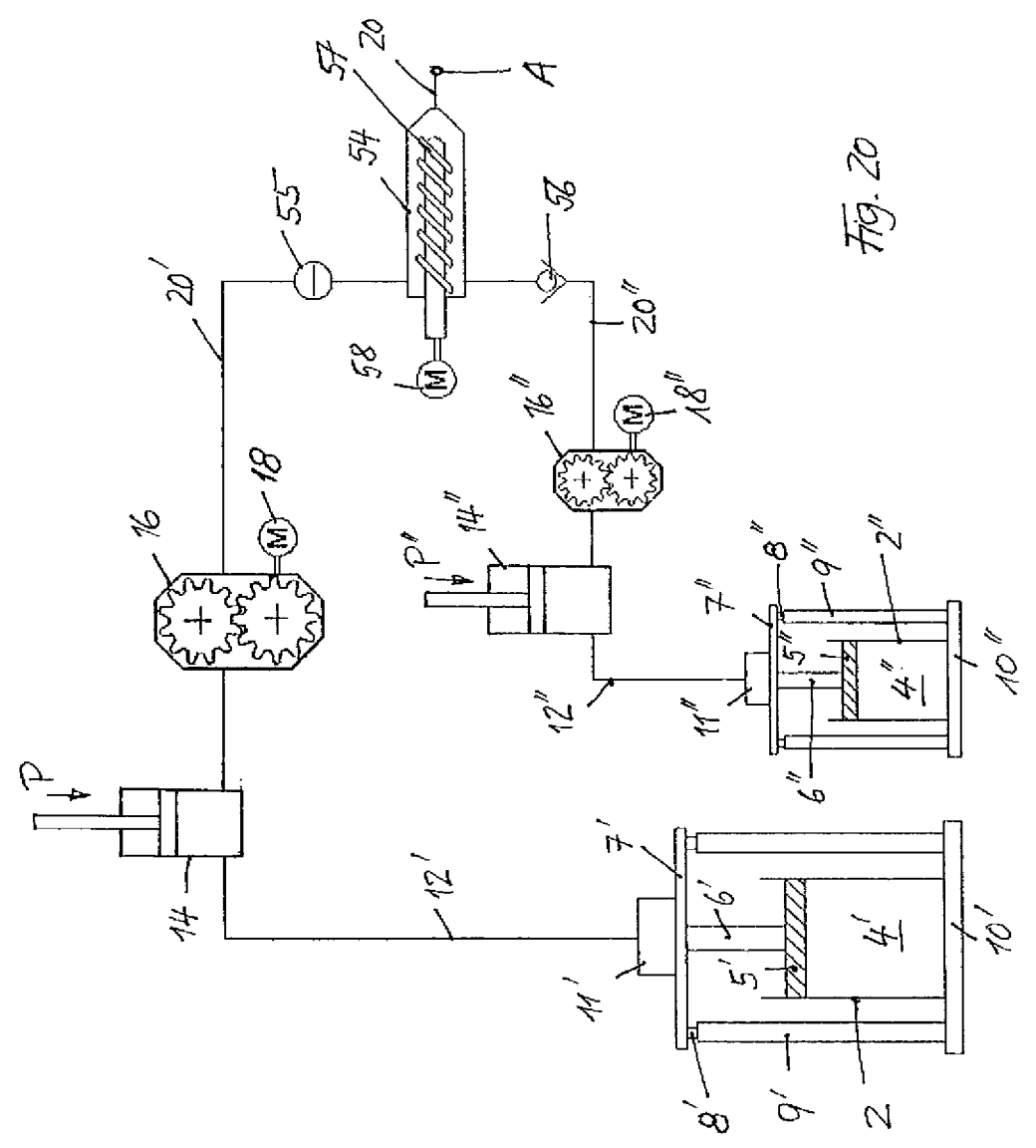

FIG. 20 shows a container 2, which contains a component 4' and which is conveyed from the container 2 into an intermediate storage 14, which is under a system pressure P, by means of a barrel pump, which consists of the same components as the barrel pump for the container 2 in FIG. 1. The second component 4" for the two-component sealing compound is accordingly located in a container 2", from which it is conveyed by means of a barrel pump through a line 12" into an intermediate storage 14", in which it is under a system pressure P". The barrel pump for the composite 2" is designed in the same manner as the barrel pump for the container 2 and is thus identified with corresponding reference numerals, which are provided with two lines.

From the intermediate storage 14, the first component 4' is supplied to a mixer 54 by means of a gear pump 16, which is driven by a motor 18, through a line 20', in which a locking slider 55 is provided. The second component 4" is pumped into the mixer 54 by means of a gear pump 16", which is driven by a motor 18", through a line 20", in which a non-return valve 56 is located. The mixer 54 is preferably a dynamic mixer, in which a mixing tool 57, which is driven by a motor 58, mixes the two components 4' and 4" with each other. The mixer 54 discharges the two-component sealing compound, which was created by the mixing, into the line 20, which leads to the nozzle 21. The connecting point A, which is identified in FIG. 20, corresponds to the connecting point A in FIG. 1.

FIG. 21 serves to explain the assembly process of the insulating glass pane. For this purpose, a second glass panel 49 is adhered to the composite strand 26. Prior to this, however, the second glass panel 49 is bent away at a corner from the first glass panel 25, whereby an opening 50 for venting the insulating glass pane is created in the area of this corner. This opening 50 is closed only after the insulating glass pane has been pressed to the target distance of the two glass panels 25 and 49.

REFERENCE NUMERALS 1 first container
2 second container
2' container
3 first sealing compound
4 second sealing compound
4' component
4" second component
5 follow-up plate
6 rod
7 traverse
8 two piston rods
9 two hydraulic cylinders
10 base plate
11 pump
11' barrel pump
12 line
12' line
12" line
13 intermediate storage
14 intermediate storage
14" intermediate storage
15 gear pump
16 second gear pump
16 gear pump
17 electric motor
18 electric motor
18" motor
19 line
20 line
20' line
20" line
21 nozzle or nozzle pair
21*a* first nozzle
21*b* second nozzle
22 orifice
23 partial strand
24 partial strand
25 glass panel
26 composite strand
27 axis of rotation
28 bottom
29 slider
29*a* slider
29*b* slider
30 wall
31 counter support
31*a* counter support
31*b* counter support
32 cogging
33 bevel
34 shaft
35 disk
36 servomotor
37 position encoder
38 port for 3
39 port for 4
40 channel
41 channel
42 partition wall
43 opening
44 air gap
45 block
46 block
47 lower edge
48 end section 49 glass panel
50 opening
51 film
52 ramp
52a first ramp
52b second ramp
53 edge of 25
54 mixer
55 locking slider
56 non-return valve
57 mixing tool
58 motor
A connecting point
P system pressure
P' system pressure
P" system pressure
D target thickness
L path

The invention claimed is:

1. A method for producing an insulating glass pane comprising a plastic spacer, wherein two glass panels that are parallel to each other have a target distance from each other, said method comprising:
   forming a composite strand by means of a nozzle and by temporally and spatially overlapping an extrusion of at least two plastic partial strands, wherein a first partial strand is made of an adhesive first sealing compound, in which a moisture-binding substance is embedded, and a second partial strand consists of an adhesive and setting second sealing compound, onto a first glass panel along an edge of the first glass panel,
   where a beginning and an end of the composite strand abut and thereby form a frame,
   where the first partial strand is extruded onto the first glass panel with a predetermined first target thickness, which is formed greater than the target distance by the means of the nozzle, and the second partial strand is extruded onto the first glass panel with a predetermined second target thickness, which is formed greater than the target distance by the means of the nozzle,
   where the partial strands are located side by side in the composite strand and thus directly adjoin each other, and
   where the first partial strand is located within the second partial strand;
   after the composite strand is disposed onto the first glass panel, joining the first glass panel to a second glass panel, so that the composite strand is located between the two glass panels, connects them to each other and holds them at a distance from each other; and
   adjusting the target distance by pressing the joined glass panels.

2. The method according to claim 1, wherein the composite strand is formed from exactly two partial strands.

3. The method according to claim 1, wherein a compound on a polyisobutylene base is used as the adhesive first sealing compound.

4. The method according to claim 1, wherein a mixture, which comprises a polyisobutylene as main component and more than 30% by weight of a reactive compound as an additional component, is used as the adhesive first sealing compound.

5. The method according to claim 1, wherein a polysulfide, a polyurethane, a silicon or a reactive adhesive is used as the adhesive and setting second sealing compound.

6. The method according to claim 5, wherein a reactive hotmelt adhesive based on butyl is used as the adhesive and setting second sealing compound.

7. The method according to claim 1, wherein prior to the joining, one of the two glass panels is bent away at a corner from the other glass panel located opposite thereto, remains bent during the joining and pressing, and the bending is reversed only when the two glass panels have reached their target distance away from a bent area.

8. The method according to claim 1, wherein the partial strands are extruded at the same time.

9. The method according to claim 1, wherein provision is made for the nozzle to comprise a plurality of nozzles, which are moved together relative to the first glass panel for the extrusion of the partial strands.

10. The method according to claim 9, wherein the nozzles are moved on a common support relative to the first glass panel.

11. The method according to claim 1, wherein the nozzle comprises a multiple port nozzle and the partial strands are extruded by the multiple port nozzle, which has ports for different plastic compounds.

12. The method according to claim 11, in which the multiple port nozzle comprises a plurality of orifices located next to each other, which are each connected to one of the ports by means of respective channels separated from each other.

13. The method according to claim 11, wherein the multiple port nozzle comprises only a single orifice, which is connected to the ports by means of separate channels, which join each other in front of the orifice.

14. The method according to claim 12, wherein the multiple port nozzle is used, in which measures are taken to impede heat transfer between the channels leading from the ports to the plurality of orifices.

15. The method according to claim 1, wherein the partial strands are extruded on the first glass panel, while it lies horizontally.

16. The method according to claim 1, wherein the composite strand or its partial strands, respectively, are applied to the first glass panel such that the composite strand is flush with the edge of the first glass panel, at least outside of corner areas of the first glass panel.

17. The method according to claim 13, wherein a multiple port nozzle is used, in which measures are taken to impede heat transfer between the channels leading from the ports to the orifice.

18. A method for producing an insulating glass pane comprising a plastic spacer, wherein two glass panels that are parallel to each other have a target distance from each other, said method comprising:
   forming a composite strand by means of a nozzle by temporally and spatially overlapping an extrusion of at least two plastic partial strands, wherein a first partial strand is made of an adhesive first sealing compound, in which a moisture-binding substance is embedded, and a second partial strand consists of an adhesive and setting second sealing compound, onto a first glass panel along an edge of the first glass panel,
   where a beginning and an end of the composite strand abut and thereby form a frame,
   where the first partial strand is extruded onto the first glass panel with a predetermined first target thickness, which is formed greater than the target distance by the means of the nozzle, and the second partial strand is extruded onto the first glass panel with a predetermined second target thickness, which is formed greater than the target distance by the means of the nozzle,
   where the partial strands are located side by side in the composite strand and thus directly adjoin each other, and where the first partial strand is located within the second partial strand;

after the composite strand is disposed onto the first glass panel, joining the first glass panel to a second glass panel, so that the composite strand is located between the two glass panels, connects them to each other and holds them at a distance from each other;

adjusting the target distance by pressing the joined glass panels; and wherein prior to the joining, one of the two glass panels is bent away at a corner from the other glass panel located opposite thereto, the one of the two glass panels remains bent during the joining and pressing, and the bending is reversed only when the two glass panels have reached their target distance away from the bent area.

* * * * *